United States Patent [19]

Sato et al.

[11] 4,378,066
[45] Mar. 29, 1983

[54] CASE FOR HOLDING MAGNETIC TAPE CASSETTE

[75] Inventors: Takateru Sato; Haruo Shiba, both of Tokyo, Japan

[73] Assignee: TDK Electronics Co., Ltd., Tokyo, Japan

[21] Appl. No.: 282,199

[22] Filed: Jul. 10, 1981

[30] Foreign Application Priority Data

Aug. 4, 1980 [JP] Japan ............................ 55-109779[U]

[51] Int. Cl.³ ........................ B65D 85/67; B65D 43/18
[52] U.S. Cl. ..................................... 206/387; 220/336
[58] Field of Search ............... 220/335, 337, 338, 334, 220/341; 206/45.2, 45.23, 45.28, 387; 150/46; 217/56, 57, 60 R; 229/43, 44 R, 44 M

[56] References Cited
U.S. PATENT DOCUMENTS 3,272,325  9/1966  Schoenmakers .................... 206/387
3,360,116  12/1967  Somers et al. ..................... 206/45.2

Primary Examiner—William Price
Assistant Examiner—Brenda J. Ehrhardt

Attorney, Agent, or Firm—Seidel, Gonda, Goldhammer & Panitch

[57] ABSTRACT

A case for holding a magnetic tape cassette comprises a case body and a cover pivotally joined together by a pair of pivots fitted in corresponding pivot-receiving holes, with arcuate protuberances formed respectively around the pivots and pivot holes in such a manner that, when the pivots have been fitted in the holes, the both protuberances coact to keep the opposing side walls of the case body and the cover apart from each other, the protuberances themselves being arranged so as not to overlap each other. The pivots protrude inwardly from the side walls of the case body, the pivot holes are formed in the side walls of the cover, and the arcuate protuberances are formed, one for each, on the inner faces of the side walls of the case body and on the outer faces of the side walls of the cover. The protuberances of the case body are formed to extend semicircularly through an angle of 180 degrees around the pivots, and the protuberances of the cover extend through an angle of 90 degrees around the pivot holes.

5 Claims, 9 Drawing Figures

CASE FOR HOLDING MAGNETIC TAPE CASSETTE

BACKGROUND OF THE INVENTION

This invention relates to a plastic case for holding a magnetic tape cassette, and more specifically to a cassette case characterized by a unique construction of the pivotal joints between the case body and the cover.

Generally, a case 1 for magnetic tape cassette, as shown in FIGS. 1 and 2, is made of a case body 2 and a cover 4. The two case members are pivotally joined by a pair of small pivots 8 protruding inwardly from the opposing end portions of two side walls 6 of the case body 2, and a pair of corresponding holes 12 formed in two side walls 10 of the cover 4 and in which the pivots are turnably fitted. Each time a tape cassette is put out of or into the case, the cover 4 is turned open and back to the closed position about the pair of pivots 8 as the fulcrums.

With such a conventional cassette case 1, as is obvious from FIGS. 1 and 2, it is common that the outer faces of the side walls 10 of the cover and the inner faces of the side walls 6 of the case body 2 are very close to each other, and the repeated opening and closing of the case tend to cause the side walls 10 of the cover to rub up against the side walls 6 of the case body, abrading the both faces to powder little by little. The resulting particles deposit on the tape cassette and the tape inside. This can cause dropouts and output variations, with consequent dropout errors, wow and flutter, and other drawbacks in practical usage of the magnetic tape.

The conventional case for magnetic tape cassette has another disadvantage. Its cover is turnable through an angle much larger than necessary, in the range from 250 to 300 degrees. Sometimes, therefore, the user attempting to take out the cassette from the case inadvertently opens the cover too wide, letting the cassette fall to be broken.

A principal object of the invention, therefore, is to provide a novel case for holding a magnetic tape cassette, whose case body and cover are protected against abrading a friction with each other at the time of opening and closing of the case, by the coaction of arcuate protuberances formed around the pivots on the case body and also around the pivot holes of the cover.

Another object of the invention is to provide a magnetic tape cassette case which is capable of storing the magnetic tape without impairing the tape quality by any particles which may otherwise be formed by abrasion of the case due to repeated opening and closing, and also capable of avoiding any danger of dropping the cassette out of the case because of the cover turning open to excess.

SUMMARY OF THE INVENTION

The above objects are realized, in accordance with the invention, by a case for holding a magnetic tape cassette comprising a case body and a cover pivotally joined together by a pair of pivots fitted in corresponding pivot-receiving holes, with arcuate protuberances formed respectively around the pivots and pivot holes in such a manner that, when the pivots have been fitted in the holes, the both protuberances coact to keep the opposing side walls of the case body and the cover apart from each other, the protuberances themselves being arranged so as not to overlap each other.

In a preferred embodiment of the invention, the pivots protrude inwardly from the side walls of the case body, the pivot holes are formed in the side walls of the cover, and the arcuate protuberances are formed, one for each, on the inner faces of the side walls of the case body and on the outer faces of the side walls of the cover. Further, in the preferred embodiment, the arcuate protuberances of the case body are formed to extend semicircularly through an angle of 180 degrees around the pivots, and the arcuate protuberances of the cover are formed to extend through an angle of 90 degrees around the pivot holes.

The magnetic tape cassette case according to the invention precludes the possibility of the side walls of the case body and the cover rubbing up against each other as the cover is turned open or back to the closed position. The case is, therefore, advantageous in that it is capable of storing the magnetic tape without impairing the tape quality by any particles which may otherwise be formed by abrasion of the case due to repeated opening and closing, and also capable of avoiding any danger of dropping the cassette out of the case because of the cover opening too wide.

BRIEF DESCRIPTION OF THE DRAWINGS

These and other objects and advantages of the invention will be more clearly understood from the following description taken in conjunction with the accompanying drawings showing an embodiment thereof. In the drawings.

DESCRIPTION OF THE PREFERRED EMBODIMENT

A magnetic tape cassette case embodying the invention will now be described in detail with reference to the drawings.

Figure 1:
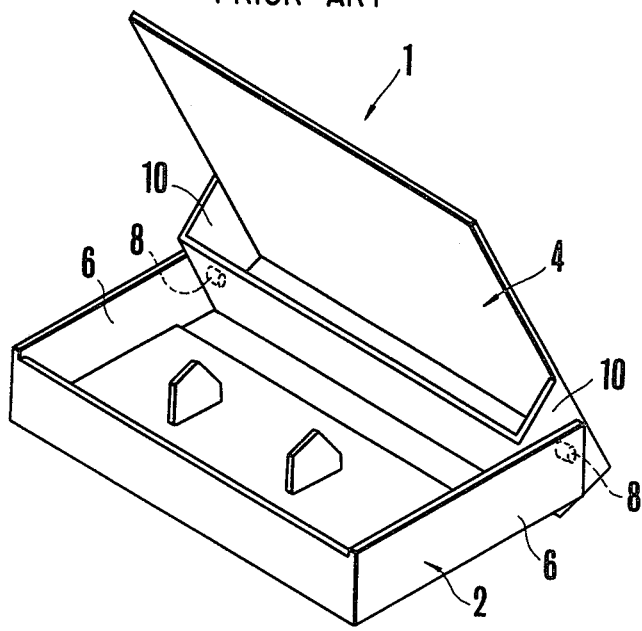
FIG. 1 is a perspective view of a conventional case for holding a magnetic tape cassette.
Figure 2:
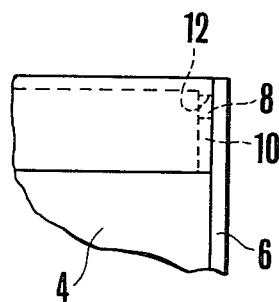
FIG. 2 is a fragmentary plan view of the case shown in FIG. 1.
Figure 3:
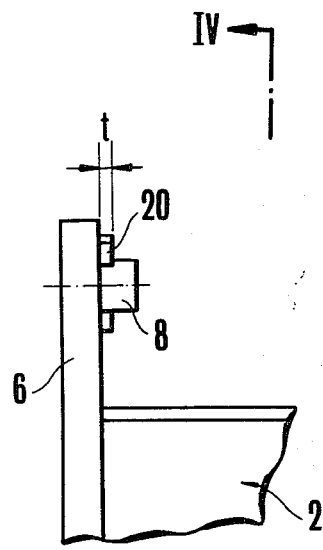
FIG. 3 is a fragmentary plan view of the case body of a case according to the present invention for holding a magnetic tape cassette.

Like the conventional plastic case shown in FIG. 1, the case according to the invention comprises a case body 2 and a cover 4. It differs from the conventional case only in the construction of the joints pivotally connecting the case body 2 with the cover 4.

Figure 4:
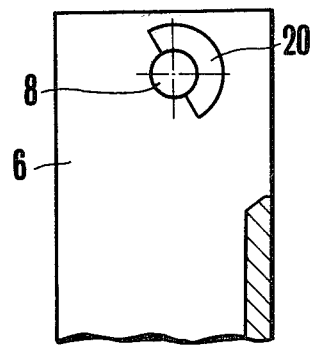
FIG. 4 is a partly sectional view taken on the line IV—IV of FIG. 3.
Figure 5:
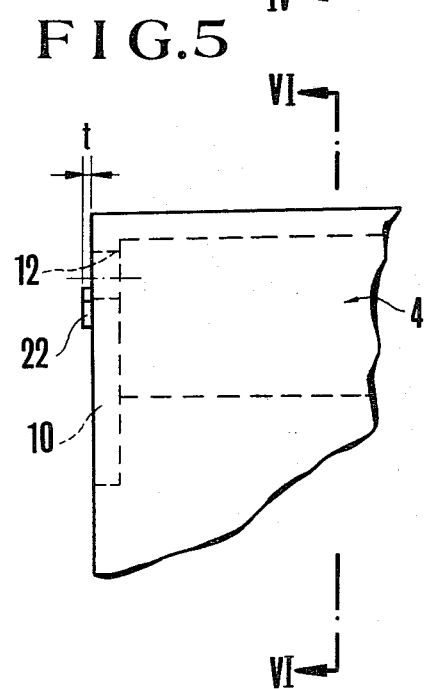
FIG. 5 is a fragmentary plan view of the cover of the magnetic tape cassette case according to the invention.

The case body 2 of the case according to the invention, too, has a pair of pivots 8 protruding inwardly from the two side walls 6, but each of the pivots has an arcuate protuberance 20 formed integrally around the lower portion of the pivot to a given height or thickness t as measured from the inner face of the side wall 6. In the embodiment being described, the arcuate protuberance 20 extends semicircularly through an angle of about 180 degrees, as best shown in FIG. 4.

Figure 6:
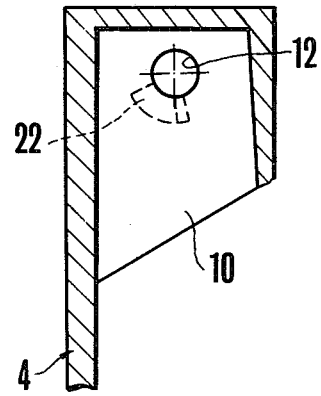
FIG. 6 is a sectional view taken on the line VI—VI of FIG. 5.

On the other hand, the cover 4 of the case has arcuate protuberances 22 formed integrally to a thickness t around a pair of pivot-receiving holes 12. In this embodiment, as best shown in FIG. 6, each of the protuberances 22 extend fanwise through an angle of about 90 degrees to enable the cover to open up to that angle.

Figure 7:
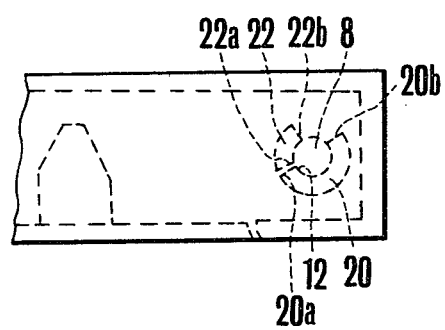
FIG. 7 is a fragmentary side view of the case, with the cover closed.
Figure 8:
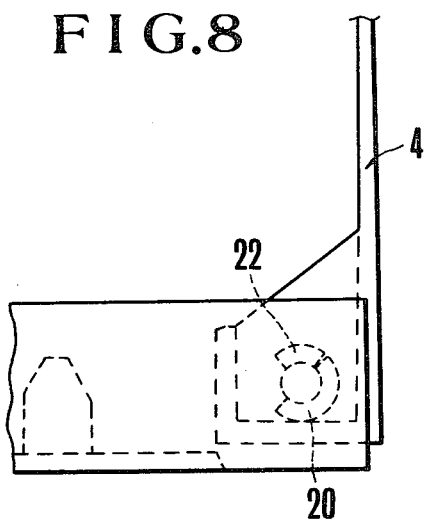
FIG. 8 is a fragmentary side view of the case, with the cover opened.
Figure 9:
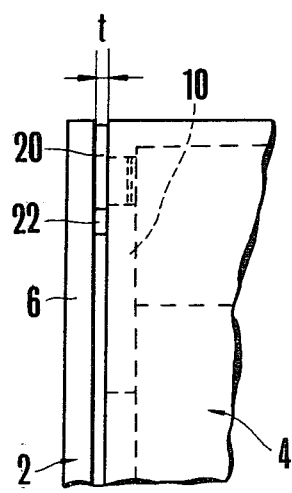
FIG. 9 is a fragmentary plan view of the cassette case of the invention.

As will be better understood by reference to FIGS. 7 and 8, each arcuate protuberance 20 of the case body 2 and the corresponding protuberance 22 of the cover 4 are formed around the associated pivot 8 and pivot hole 12, respectively, in such locations that, when the two case members have been assembled together, the two protuberances do not overlap but adjoin end to end in an incompletely circular arrangement. Thus, when each pivot 8 has been fitted in the mating hole 12, their arcuate protuberances 20 and 22, as indicated in FIG. 9, jointly serve as a spacer which keeps the side walls 6 and 10 of the case body and cover the distance t apart. In this way the side walls of the both case members are protected against rubbing up against each other as the cover 4 is turned open and back. Hence there is no possibility of the abrasion of the case surfaces producing particles that would have deleterious effects upon the performance of the magnetic tape.

As illustrated in FIGS. 7 and 8, the arcuate protuberances 20 and 22 also combinedly act as means to limit the angle through which the cover is turnable to open and close the case. When the case is kept closed, one end 22a of the arcuate protuberance 22 of the cover is in position close to one end 20a of the semicircular protuberance 20 on the case body (FIG. 7). When the cassette is to be taken out of the case, the cover 4 is turned open until the other end 22b of its arcuate protuberance 22 abuts against the other end 20b of the protuberance 20 of the case body 2. Stopped by the latter, the cover 4 is not allowed to turn any more. Although this embodiment is designed so that the cover may turn through an angle of 90 degrees as already mentioned, the maximum angle at which the cover opens can be varied by forming the arcuate protuberances to other desired angular dimensions.

The embodiment has been described as having the pivots 8 formed integrally on the case body 2 and the pivot holes 12 formed in the cover 4. However, it will readily occur to those skilled in the art that, alternatively, the pivot holes may be formed in the case body and the pivots, on the cover.

While a preferred embodiment of the invention has been described using specific terms, such description is for illustrative purposes only, and it is to be understood that changes and variations may be made without departing from the spirit or scope of the following claims.

What is claimed is:

1. A case for holding a magnetic tape cassette comprising a case body having side walls and a cover having side walls, said side walls of said case body and said cover opposing each other, said body and cover being pivotally joined together by a pair of pivots fitted in corresponding pivot-receiving holes, characterized by arcuate protuberances formed respectively partially around said pivots and pivot holes in such a manner that, when said pivots have been fitted in said holes, said both protuberances coact to keep the opposing side walls of said case body and said cover apart from each other, said protuberances being circumferentially arranged so as not to overlap each other.

2. A case according to claim 1, wherein said pivots protrude inwardly from the side walls of said case body, said pivot holes are formed in the side walls of said cover, and said arcuate protuberances are formed, one for each, on the inner faces of said side walls of said case body and on the outer faces of said side walls of said cover.

3. A case according to claim 2, wherein said arcuate protuberances of said case body are formed to extend semicircularly through an angle of 180 degrees around said pivots, and said arcuate protuberances of said cover are formed to extend through an angle of 90 degrees around said pivot holes.

4. A case according to claim 1 wherein said protuberances have the same thickness and said protuberances being a limit stop for limiting the opening movement of said cover.

5. A case for holding a magnetic tape cassette comprising a case body having side walls and a cover having side walls, said side walls of said case body and said cover opposing each other, said body and cover being pivotally joined together by a pair of pivots fitted in corresponding pivot-receiving holes, means for preventing said opposing walls from rubbing against one another, said means including arcuate protuberances formed respectively partially around said pivot and pivot holes in such a manner that, when said pivots have been fitted in said holes, said both protuberances coact to keep the opposing side walls of said case body and said cover apart from each other, said protuberances being circumferentially arranged so as not to overlap each other and having the same thickness, said protuberances being a limit stop for limiting the opening movement of said cover.

* * * * *